United States Patent
Bywaters et al.

(10) Patent No.: US 10,632,889 B2
(45) Date of Patent: Apr. 28, 2020

(54) RETRACTABLE TABLE

(71) Applicant: BENTLEY MOTORS LIMITED, Crewe (GB)

(72) Inventors: Lucy Bywaters, Nantwich (GB); Clive McVety, Nantwich (GB); James Piggin, Winsford (GB)

(73) Assignee: Bentley Motors Limited, Crewe, Cheshire (GB)

(*) Notice: Subject to any disclaimer, the term of this patent is extended or adjusted under 35 U.S.C. 154(b) by 110 days.

(21) Appl. No.: 15/754,289

(22) PCT Filed: Aug. 22, 2016

(86) PCT No.: PCT/GB2016/052591
§ 371 (c)(1),
(2) Date: Feb. 21, 2018

(87) PCT Pub. No.: WO2017/032991
PCT Pub. Date: Mar. 2, 2017

(65) Prior Publication Data
US 2018/0251057 A1    Sep. 6, 2018

(30) Foreign Application Priority Data

Aug. 24, 2015 (GB) .................................. 1514993.3

(51) Int. Cl.
*B60N 3/00* (2006.01)
*B60N 2/75* (2018.01)
*B60R 7/04* (2006.01)

(52) U.S. Cl.
CPC ............. *B60N 3/002* (2013.01); *B60N 2/793* (2018.02); *B60N 3/001* (2013.01); *B60R 7/04* (2013.01)

(58) Field of Classification Search
CPC .. B60R 5/04; B60R 7/04; B60N 3/001; B60N 3/10; B60N 3/002

USPC ........................................................ 296/24.34
See application file for complete search history.

(56) References Cited

U.S. PATENT DOCUMENTS

| | | | | |
|---|---|---|---|---|
| 4,805,953 A * | 2/1989 | Yamauchi | ............ | B60N 2/3013 296/65.09 |
| 5,372,403 A * | 12/1994 | Puerto | ...................... | A47C 1/03 297/145 |
| 6,220,658 B1 * | 4/2001 | Lukawski | ................ | A47C 7/70 297/145 |

(Continued)

FOREIGN PATENT DOCUMENTS

| CA | 2742559 A1 | 12/2012 |
|---|---|---|
| CN | 204191942 U | 3/2015 |

(Continued)

*Primary Examiner* — Pinel E Romain (74) *Attorney, Agent, or Firm* — Schwabe Williamson & Wyatt, P.C.

(57) ABSTRACT

A retractable table assembly (5) for an automobile has a housing (6) located between the rear seats (2,3). Two tabletops (17a, 17b) are stowed in the housing and deployed on rotatable arms (12a, 12b). The arms are resiliently biased to the deployment position and when stowed, the tabletops are kept in place by push-push latches. A secondary link (16) between the tabletops and the pivot-point of the arms is provided, which maintains the relative disposition of the tabletop in relation to the housing during deployment. The tabletops can be deployed side-by-side so as to provide an expanded surface for working on.

19 Claims, 12 Drawing Sheets

(56) References Cited

U.S. PATENT DOCUMENTS

| | | | | |
|---|---|---|---|---|
| 7,641,252 | B2* | 1/2010 | Sturt | B60N 3/002 296/24.34 |
| 7,798,072 | B2* | 9/2010 | Becker | B60N 3/002 108/42 |
| 8,672,400 | B2* | 3/2014 | Henderson | B60N 3/002 297/160 |
| 9,371,026 | B2* | 6/2016 | Chang | B60N 3/002 |
| 2006/0220426 | A1 | 10/2006 | Moffatt | |
| 2014/0252811 | A1* | 9/2014 | Whalen | B60N 3/002 297/144 |
| 2016/0272098 | A1* | 9/2016 | Barnes | B60N 3/001 |

FOREIGN PATENT DOCUMENTS

| | | |
|---|---|---|
| DE | 10044414 A1 | 3/2002 |
| DE | 102012002562 A1 | 8/2013 |
| EP | 1160125 A2 | 12/2001 |
| GB | 2519603 A | 4/2015 |
| WO | WO0047442 A1 | 8/2000 |
| WO | WO2004005069 A1 | 1/2004 |
| WO | WO-2013123957 A1 * 8/2013 ............. B60N 3/002 |

* cited by examiner

RETRACTABLE TABLE

CROSS REFERENCE TO RELATED APPLICATIONS

The present application is a national phase entry under 35 U.S.C. § 371 of International Application No. PCT/GB2016/052591, filed Aug. 22, 2016, entitled "RETRACTABLE TABLE," which designated, among the various States, the United States of America, and which claims priority to GB 1514993.3 filed Aug. 24, 2015, both of which are hereby incorporated by reference.

TECHNICAL FIELD OF THE INVENTION

The present invention relates to retractable table assemblies and in particular, but not exclusively to retractable table assemblies comprising tabletops which retract into and are deployed from a space between two seats, such as armrests or the like between two passenger seats in the rear of an automobile.

BACKGROUND TO THE INVENTION

Retractable table assemblies are well known and are found particularly in aeroplanes and other passenger vehicles, such as automobiles. In automobiles, retractable tables are normally either arranged to fold down from the seat in front of the passenger, or arranged to fold out from an armrest located between two rear seats.

DE10044414 for example discloses a retractable table assembly, in which two tables are deployable from a centrally mounted armrest by pulling the tables forward on telescopic arms, then rotating the telescopic arm such that a support panel extends outwards, away from the centre and folding out the tables which are hingably mounted to the support panel.

DE 102011103614 discloses a folding table, which folds out (about a horizontal axis) from an armrest which is itself foldable. This table has a first position, when initially folded out forward, in which it is centrally disposed, a second position, in which it is rotated about a longitudinally extending horizontal axis towards the sides of the vehicle and a third position, in which a second flap/leaf of the table is folded out from the first to extend the width of the table. A second retractable table deploys as a mirror image of the first.

DE102012002562 discloses another folding table, in which the table can be pulled out of the armrest by rotating a first arm about a lateral axis to a vertical position, then a second arm which initially extends in line with the first arm can be folded about a longitudinal axis to a horizontal position, before the table is rotated about a vertical axis (towards the distal end of the second arm) to take it to a position further from the centrally disposed armrest, and in front of the user. This table, again, is formed of two leaves, such that one may be folded out (forwards about a lateral axis) from the other to double the size of the table.

US2002/0003361 discloses another folding table, which has a housing which, like the arm of DE102012002562 rotates upwards about a pivot point towards the front of a housing located between two rear seats. In this case, however, the table is received in the housing and can be slid upwards out of the housing, before pivoting about a longitudinal axis to a position in front of the user. In this arrangement the mount or "slide guide" includes a pivoting plate, on which the table top is mounted in order to adjust the inclination of the table.

It will be understood in the context of this description that a longitudinal axis is that which extends from the front to rear of a vehicle, a lateral axis extends from side to side and a "vertical" axis extends from top to bottom. Clearly the expressions are used in general sense and not precisely, for example "vertical" does not necessarily mean towards the zenith.

Whilst there are many different arrangements for folding tables, disadvantages of the various designs remain. For example the tables mentioned above require the user to pull out the table from its initial position, which can be awkward in the confined spaces of the rear of a vehicle, such as an automobile, especially if holding papers, drinks etc. which are to be placed on the table. Moreover, the overall size of the table is often quite small, despite the use of two leaves to double the total size, because of the need for the table to retract into a small space.

SUMMARY OF THE INVENTION

According to a first aspect of the invention, there is provided a retractable table assembly, the retractable table assembly comprising a tabletop which is moveable between a deployed position and a retracted position and carried by an arm; wherein the arm is resiliently biased towards the deployed position.

The tabletop may be held in the retracted position by a latch.

Having a resilient bias towards the deployed position can ease operation of the tabletop, since the table is urged by the bias towards the deployed position and will therefore move automatically to an at least partially deployed position, once the latch is released, avoiding the awkward pulling action. Certain motorised systems are also known, which avoid this pulling motion, but they are costly, complex and heavy.

The latch may be a push-push latch, such that pushing the tabletop from the deployed position into the retracted position and then releasing it, for example pushing it downwards into a housing, which comprises the latch, against the resilient bias, closes the latch to hold the tabletop in the retracted position, and pushing the tabletop in the retracted position further towards the retracted position, e.g. downwards into the housing against the resilient bias, opens the latch, such that the resilient bias urges the tabletop towards the deployed position.

The latch may be a pin and heart curve mechanism. Various pin and heart curve mechanisms are known, and could be used, for example that shown in U.S. Pat. No. 6,247,733.

The resilient biased arm may be biased by a resilient member, which may be a spring, such as a helical compression spring, or a gas strut. The assembly may further comprise a damper to damp movement of the resilient member.

The retractable table assembly may comprise a housing. The housing may be located to the side of a seat, such that in the retracted position the tabletop is stowed to the side of a user sitting in the seat and in the deployed position the tabletop is capable of being arranged in a substantially horizontal disposition in front of the user. The housing may be located centrally between two seats.

The arm may be pivotally mounted to the housing at a first pivot point.

The tabletop may be pivotally mounted to the arm at a second pivot point

A secondary link may be provided between the housing and the tabletop and offset relative to the line between the first and second pivot points in order to maintain the relative disposition of the tabletop in relation to the housing, as the arm is rotated about the first pivot point.

According to a second aspect of the invention there is provided a retractable table assembly comprising a housing, a tabletop which is moveable between a deployed position and a retracted position, and an arm which carries the tabletop; the arm being pivotally mounted to the housing at a first pivot point and pivotally mounted to the tabletop at a second pivot point, wherein a secondary link is provided between the housing and the tabletop and offset relative to the line between the first and second pivot points in order to maintain the relative disposition of the tabletop in relation to the housing, as the arm is rotated about the first pivot point.

Maintaining the relative disposition of the tabletop in relation to the housing rather than in relation to the arm that carries it produces a movement that appears more elegant than a simple rotation of the tabletop along with the arm. This is desirable in the context of luxury automobiles in which the tabletop of the invention is most likely to be installed. The secondary link is preferably provided in the arm. With the secondary link provided in the arm, the possibility of trapping fingers etc. is prevented, and a neater appearance, more suited to a luxury automobile is achieved.

Moreover, this motion can make subsequent unfolding of the table more intuitive and can even reduce the length required of the housing. Where the disposition of the tabletop is fixed relative to the arm, as the arm pivots upward, the distance between the pivot point and the lowermost and furthest part of the table remains constant, with the furthest part of the table following an arc upwards and rearwards as it moves out of the housing. By fixing the disposition of the housing, the furthest lowermost part of the table does not move rearwards so much during this motion.

In either the first or second aspect of the invention, the tabletop may be attached to the second pivot point and the secondary link via a support panel. The support panel may thus maintain its disposition relative to the housing during the deployment of the arm. The support panel may be rotatably attached to the second pivot point and the secondary link so as to be rotatable about a longitudinal axis.

In either the first or second aspect of the invention, the arm may rotate about a lateral axis and may rotate to a substantially vertical deployed position. A latch may hold the arm in the deployed position. A button may be provided connected to the latch by a Bowden cable for example, such that when operated, the button unlatches the latch, allowing the arm to be folded away.

In either the first or second aspect of the invention, the resilient bias may be provided by a resilient member, attached at one end to the arm, so as to urge the arm to rotate about the pivot point.

In either the first or second aspect of the invention, the housing may extend longitudinally and the first pivot point may be provided at the front of the housing, with the arm extending downwardly and rearwardly in the housing, when the tabletop is in the retracted position.

In either the first or second aspect of the invention, the resilient member may extend forward of the housing. This causes it to be out of sight in the housing when the table is moved to the deployed position avoiding it from trapping fingers, getting dirt in moving parts, or simply being unsightly.

In either the first or second aspect of the invention, the tabletops may each comprise two leaves. The leaves may be hingably connected such that the second leaf folds out from the first leaf to form a larger tabletop surface.

In a third aspect of the invention there is provided a retractable table assembly for arrangement centrally between two seats; the retractable table assembly comprising two tabletops each moveable between a deployed position and a retracted position and carried by a respective arm; each tabletop being mounted to its respective arm via a support panel; each support panel being pivotably mounted to the respective arm at its proximal end and connected to the respective tabletop at its distal end, such that in the deployed position each support panel extends laterally outwardly towards its respective seat; wherein the tabletops are arranged such that in a centrally deployed position one tabletop is deployed centrally, between the seats, whereby the deployed tabletop extends from the distal end of the support panel towards, and beyond, its proximal end; in a laterally arranged position, either tabletop, or both tabletops are deployed laterally (in front of a passenger in a respective seat) whereby the or each deployed tabletop extends from the distal end of its respective support panel in the direction away from its proximal end; and in an expanded surface position, a first one of the tabletops is deployed laterally, extending away from the proximal end of its support panel and a second tabletop is deployed centrally, whereby the second tabletop extends from the distal end of its respective support panel towards and beyond the proximal end of the support panel and over the proximal end of the other support panel, so as to be adjacent the first tabletop and thereby form an expanded surface (in front of a passenger and centrally).

This arrangement is very useful, especially in luxury vehicles, such as luxury automobiles which often carry only a single passenger who requires table space because it expands the usable surface area of the tabletop that is within easy reach.

The retractable table assembly of the third aspect of the invention may further comprise the features of the retractable table assembly of the first and/or second aspects of the invention, optionally including the optional features. The following optional features may apply to any of the first, second or third aspects of the invention.

In the expanded surface position there may be substantially no gap between one tabletop and the other. If there is a gap, the gap may be less than 5 cm, preferably less than 4 cm, for example, about 3 cm, or less than 1 cm. With such a small gap, the tabletops effectively act as a single large surface to work on, on which work etc. can be spread out rather than split between tables.

The tabletops may be rotatably connected to their respective support panels, so as to rotate relative to the support panels between the laterally arranged position and the centrally arranged position.

Each tabletop may be provided as two leaves, with the proximal end of the first leaf connected to the support panel and the second leaf connected to the distal end of the first leaf. This means that in the laterally arranged position, opening the second leaf extends the tabletop further laterally away from the centre, and in the centrally deployed position, opening the second leaf extends the tabletop to cover more of the central area.

The table assembly may be arranged such that in the expanded surface position, the second leaf of the centrally deployed tabletop may be supported by the support panel of the laterally deployed tabletop. This provides additional stability to the arrangement and makes the two tables feel more like a single surface.

The arms may be mounted so as to rotate about the same (lateral) axis.

The or each tabletop may be tiltable in the deployed position. This allows for a change of angle, which may be useful for example if the tabletop is used to support a tablet for viewing movies or the like.

The or each support panel may comprise a tilting mechanism so as to adjust the angle between the proximal end connected to a respective arm, and the distal end connected to a respective tabletop. The tilting mechanism may comprise a latch, e.g. a button operated latch, that must be unlatched in order to tilt the respective tabletop and/or a damping mechanism to keep the level of tilt constant.

Another aspect of the invention provides an automobile comprising a retractable table assembly according to the invention.

The automobile may comprise two rear passenger seats, with the retractable table assembly located therebetween. The retractable table assembly may be located in an armrest.

DETAILED DESCRIPTION OF THE INVENTION

In order that the invention may be more clearly understood an embodiment thereof will now be described, by way of example only, with reference to the accompanying drawings, of which.

Figure 1:
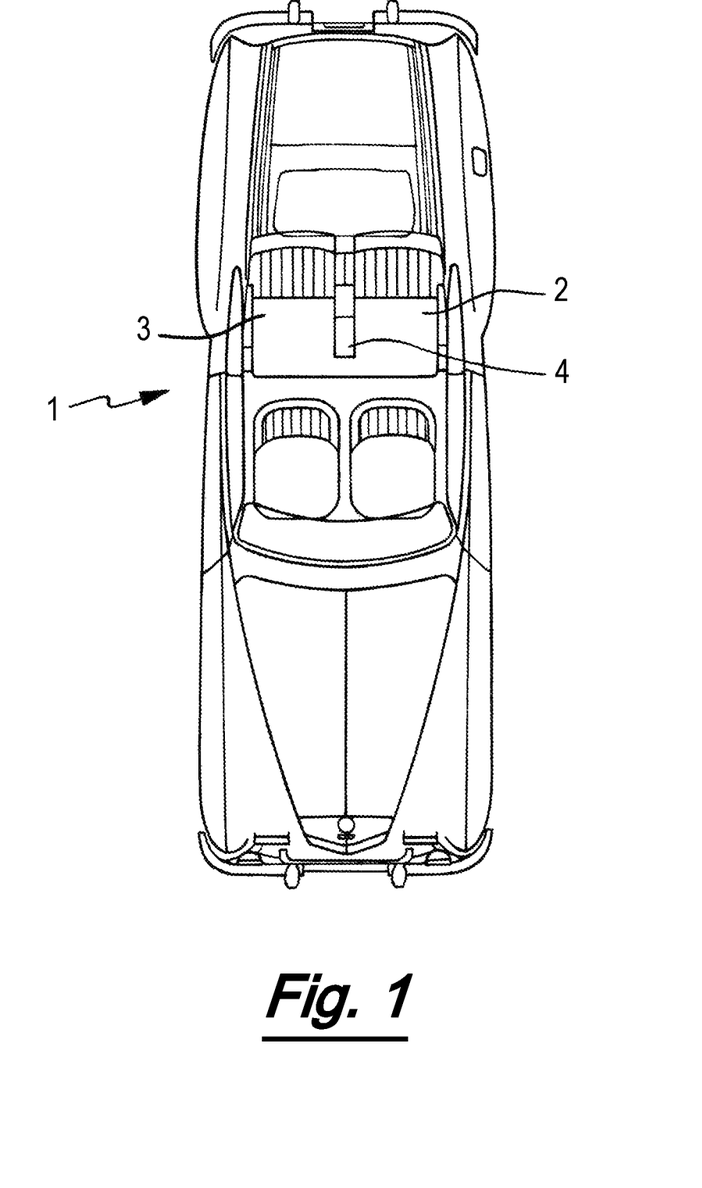
FIG. 1 shows a plan view of an automobile comprising the retractable table assembly of the invention in the stowed position.

With reference to FIG. 1, an automobile 1 is provided with two rear seats 2, 3 each arranged to accommodate a passenger (not shown) facing forwards. Between the seats 2, 3, centrally disposed, is an armrest 4, in which the table assembly 5 shown in FIGS. 2 to 12 is provided. It will be appreciated by those skilled in the art that the table assembly 5 may equally be provided in other vehicles, or even outside the vehicular environment.

Figure 2:
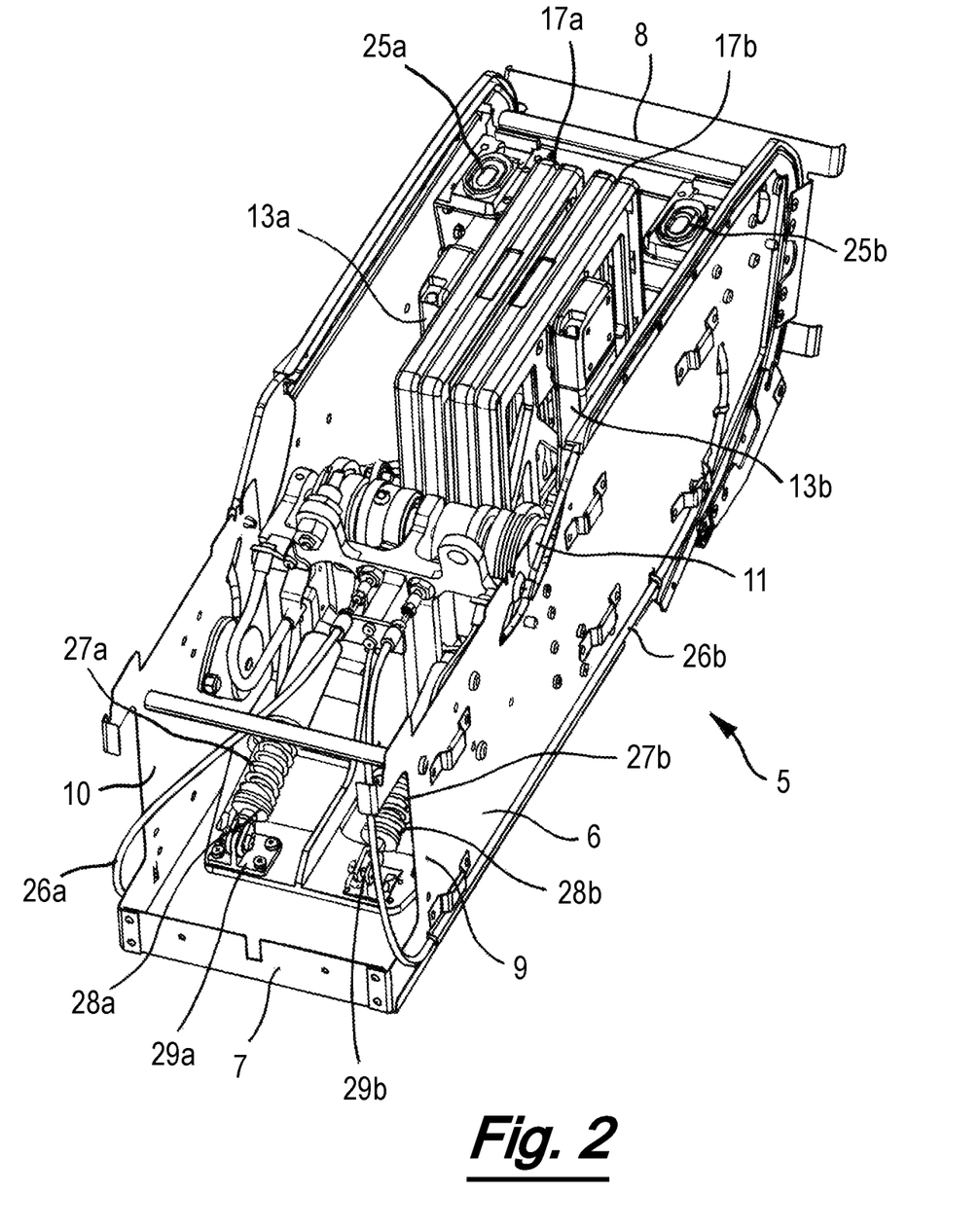
FIG. 2 shows an isometric view of the retractable table assembly of FIG. 1 with both tabletops in the stowed position.
Figure 3:
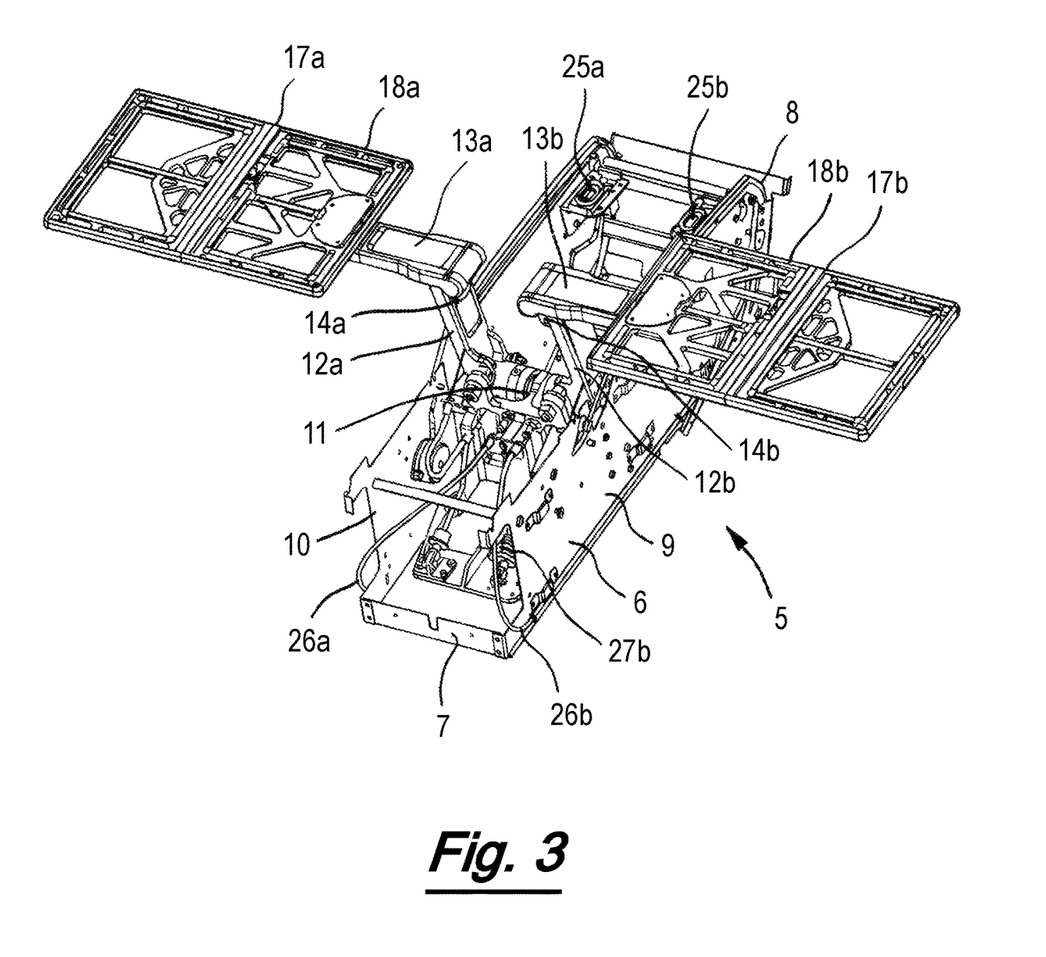
FIG. 3 shows an isometric view of the retractable table assembly of FIGS. 1 and 2 with both tabletops in the laterally deployed position.

As shown in FIGS. 2 and 3, the retractable table assembly 5 comprises a housing 6, which is located between the seats 2,3. The housing 6 has a forward end 7 and a rearward end 8, with lateral sidewalls 9, 10 extending therebetween. An axle 11 having a laterally extending axis extends between the sidewalls 9, 10 towards the front and the top of the housing 6.

Figure 4:
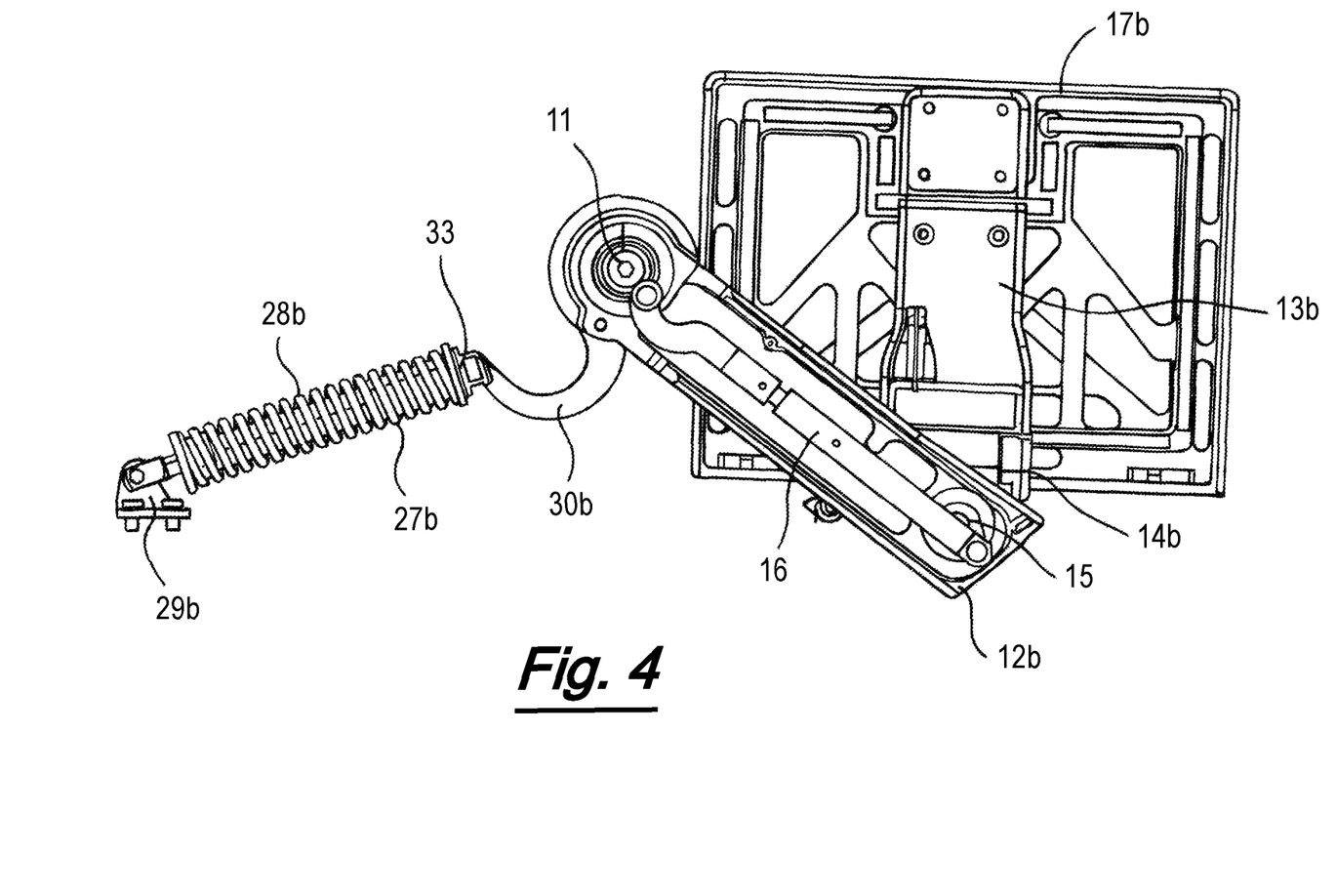
FIG. 4 shows a side view of one of the tabletops in the retractable table assembly of FIGS. 1-3 and its associated deployment mechanism, in the stowed state.
Figure 5:
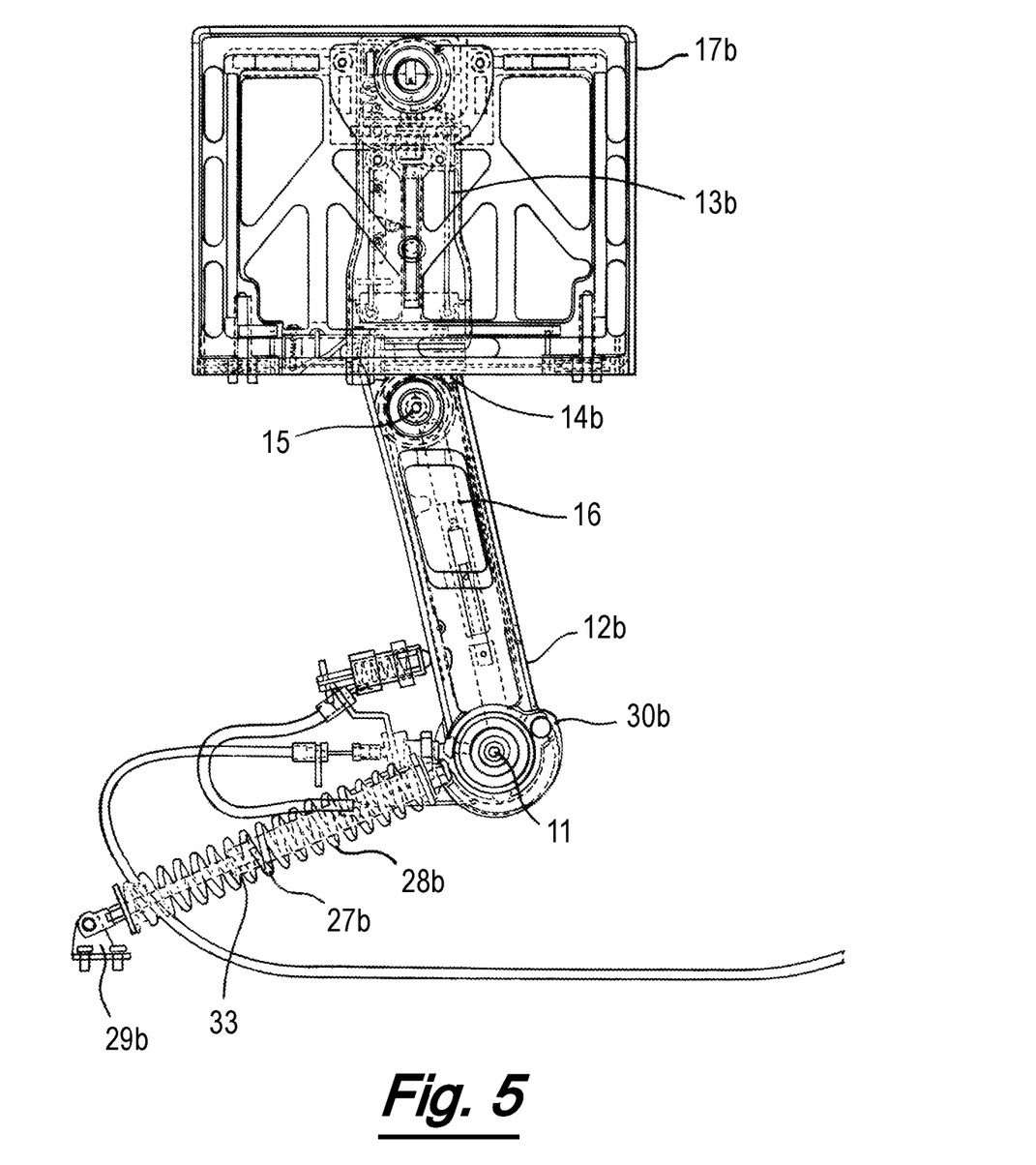
FIG. 5 shows a side view of the tabletop and deployment mechanism of FIG. 4 with the arm in the deployed state.

The proximal end of each of a pair of arms 12a, 12b is pivotally mounted for rotation about the axle 11, or first pivot point, so as to move between the stowed position shown in FIG. 4, in which the arm extends rearwardly and downwardly and the deployed position shown in FIG. 5, in which the arm extends upwardly and slightly forwardly.

The distal end of each arm 12a, 12b is pivotally mounted to a support panel 13a, 13b, via a mount 14a, 14b at a second pivot point.

Figure 10:
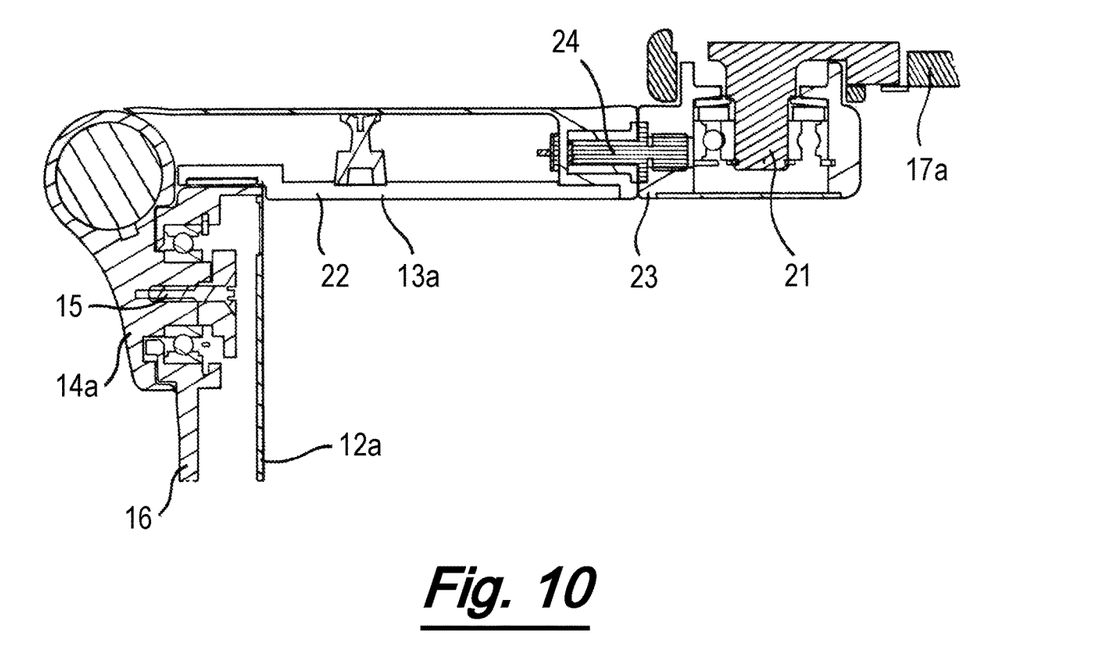
FIG. 10 shows a cross sectional view through the upper portion of one arm and the support panel of the retractable table assembly of FIGS. 1-9.

As shown in FIGS. 4, 5 and 10, each mount 14a, 14b is rotatably connected to its respective arm 12a, 12b by attachment to a shaft 15 which extends through the arm 12a, 12b. Within each arm 12a, 12b, a secondary link 16 is provided. The secondary link 16 is pivotally attached at one end in a fixed position offset relative to the axis of the axle 11 (downwards and rearwards of the axle 11). At the other end, the secondary link is attached to the shaft 15 in an equally offset position relative to its axis. Accordingly, as the arm 12a, 12b rotates, the mount 14a, 14b counter-rotates, such that the disposition of the mount, i.e. its orientation (and the orientation of the items attached thereto and discussed below) relative to the housing 6 remains constant.

Once the respective arm 12a, 12b is in the deployed position, a latch (not shown) engages the proximal end of the arm 12a, 12b to hold it in the upright, deployed, position. The pivotal attachment between the support panel 13a, 13b and the mount 14a, 14b is arranged such that throughout the deployment of the arm 12a, 12b, the support panel extends substantially vertically, with the proximal end connected to the arm 12a, 12b at the bottom, and the distal end at the top. The axis about which the respective support panel 13a, 13b rotates extends longitudinally, i.e. along the length of the automobile 1. Thus, once the respective arm 12a, 12b has reached its deployed position, the respective support panel 13a, 13b may be pivoted outwards relative to the arm 12a, 12b, to a substantially horizontal laterally outwardly extending position shown in FIG. 6.

The distal end of each support panel 13a, 13b is connected to a tabletop 17a, 17b via a shaft 21 (FIG. 10) extending to the opposite side of the support panel 13a, 13b to the shaft 15, such that when stowed, the tabletop 17a, 17b is the opposite side of the support panel 13a, 13b from the arm 12a, 12b. In the stowed position, the two tabletops 17a, 17b are centrally disposed, adjacent to one another, the support panels 13a, 13b are laterally disposed outside the tabletops 17a, 17b, and the arms 12a, 12b are disposed laterally outside the support panels 13a, 13b.

Each tabletop 17a, 17b is formed of two rectangular leaves. A proximal end of the first leaf 18a, 18b of each tabletop 17a, 17b is connected via the shaft 21 to the support panel 13a, 13b, so as to be rotatable about a 180 degree angle relative to the support panel 13a, 13b. The second leaf 19a, 19b of each tabletop 17a, 17b is attached by hinges 20 (FIG. 6) to the distal end of the first leaf 18a, 18b, such that in the stowed position, the leaves are folded up next to each other, but when deployed, the second leaf 19a, 19b can be unfolded to double the size of the surface of the tabletop 17a, 17b.

Thus, in the folded configuration (shown in FIG. 6), the upper surface of the tabletop 17a, 17b consists of one surface of the second leaf 19a, 19b, but in the unfolded configuration (e.g. FIG. 3), the opposite surface of the second leaf 19a, 19b and the upper surface of the first leaf 18a, 18b make up the upper surface of the tabletop 17a, 17b.

Figure 6:
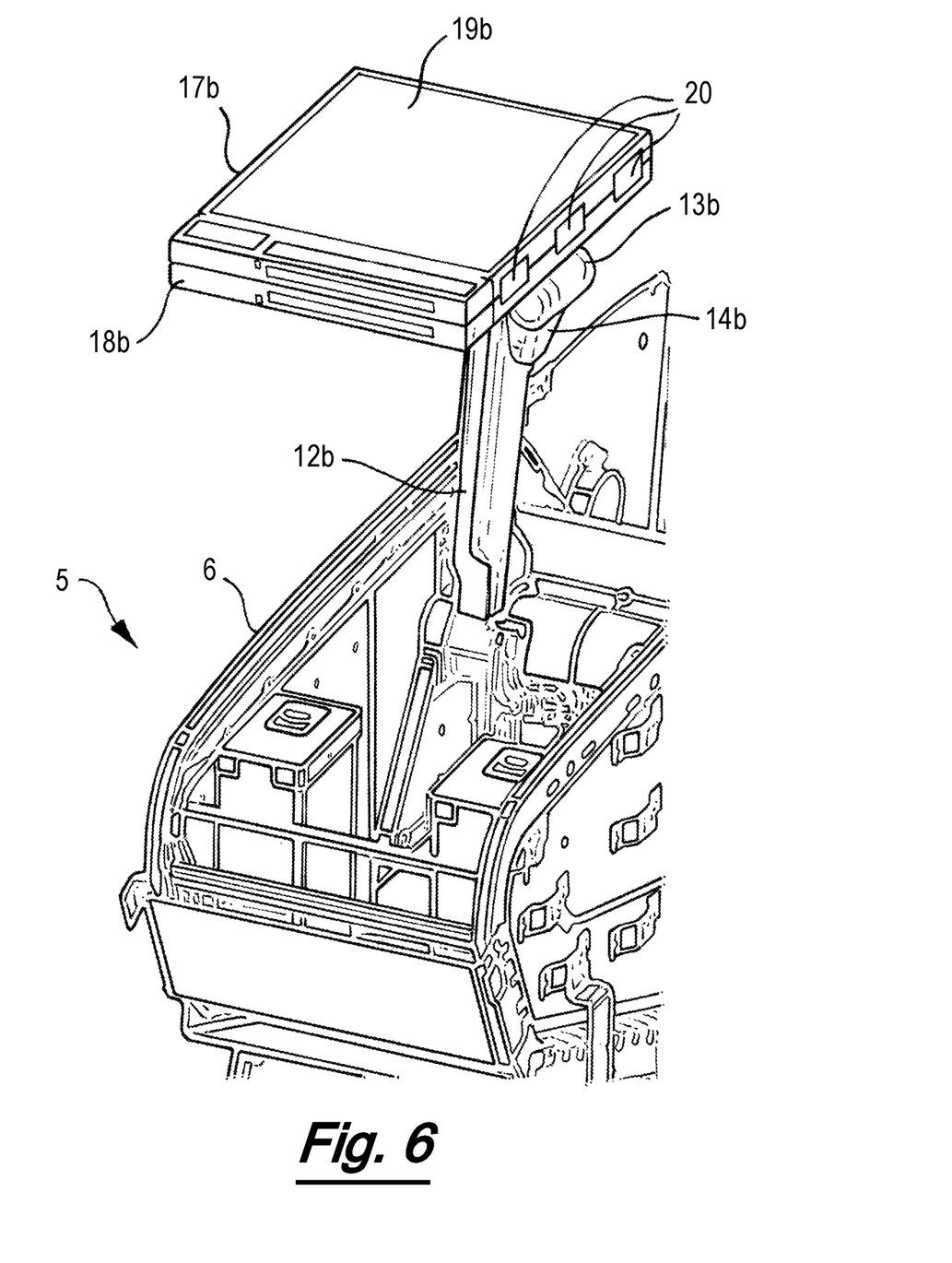
FIG. 6 shows a rear perspective view of the retractable table assembly of FIGS. 1-3 with one tabletop in a centrally deployed position.

The tabletops 17a, 17b may be arranged in various deployed positions. The initial deployed position that the tabletops 17a, 17b automatically take up when the support panels 13a, 13b are pivoted outwards and extend laterally outwards towards their respective seat 2, 3 is shown in FIG. 6. Here the leaves of the respective tabletop 17a, 17b are folded and the tabletop 17a, 17b is in a centrally deployed position, with the tabletop 17a, 17b extending centrally from the distal end of the support panel 13a, 13b, towards its proximal end. Both tabletops 17a, 17b may simultaneously adopt this position, so as to provide a small surface to the side of each respective passenger.

Figure 7:
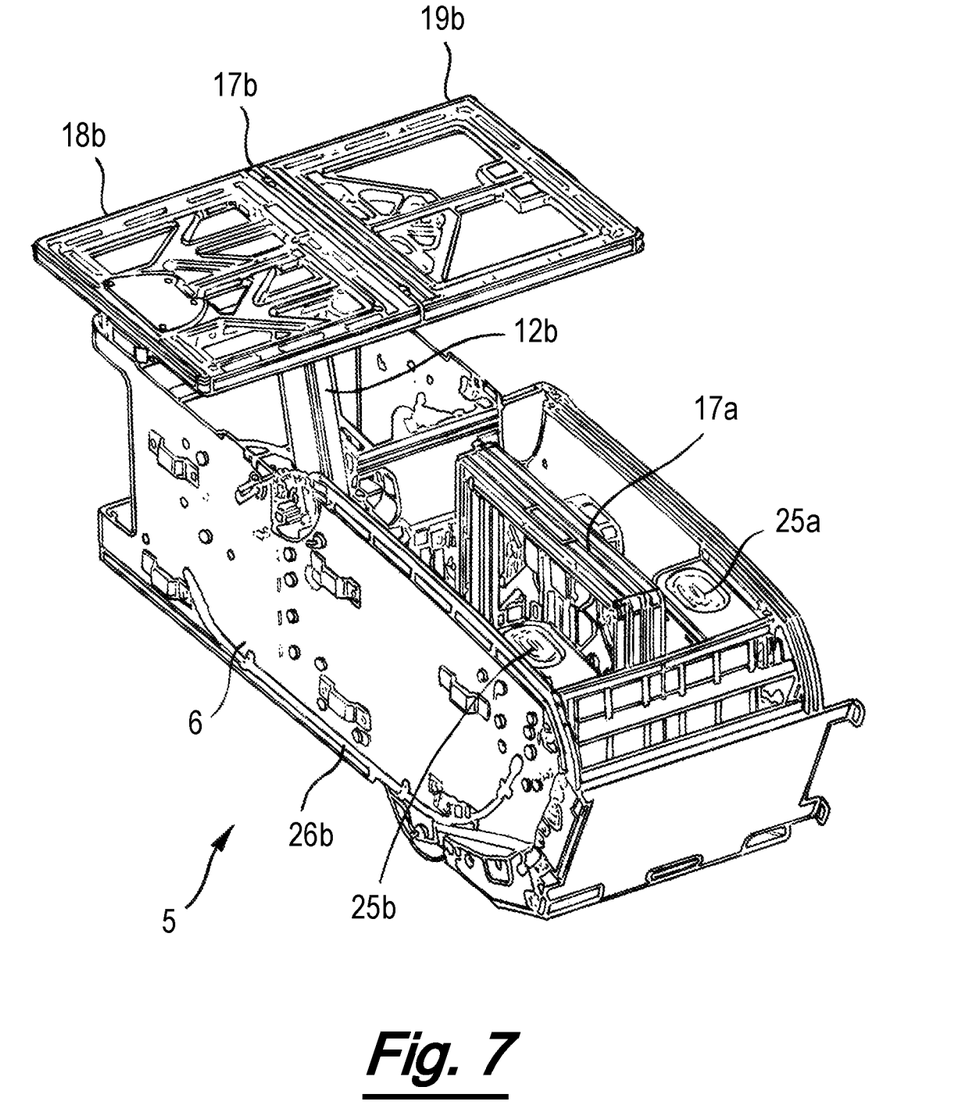
FIG. 7 shows a rear perspective view of the retractable table assembly of FIG. 6 with one tabletop in the unfolded centrally deployed position.
Figure 8:
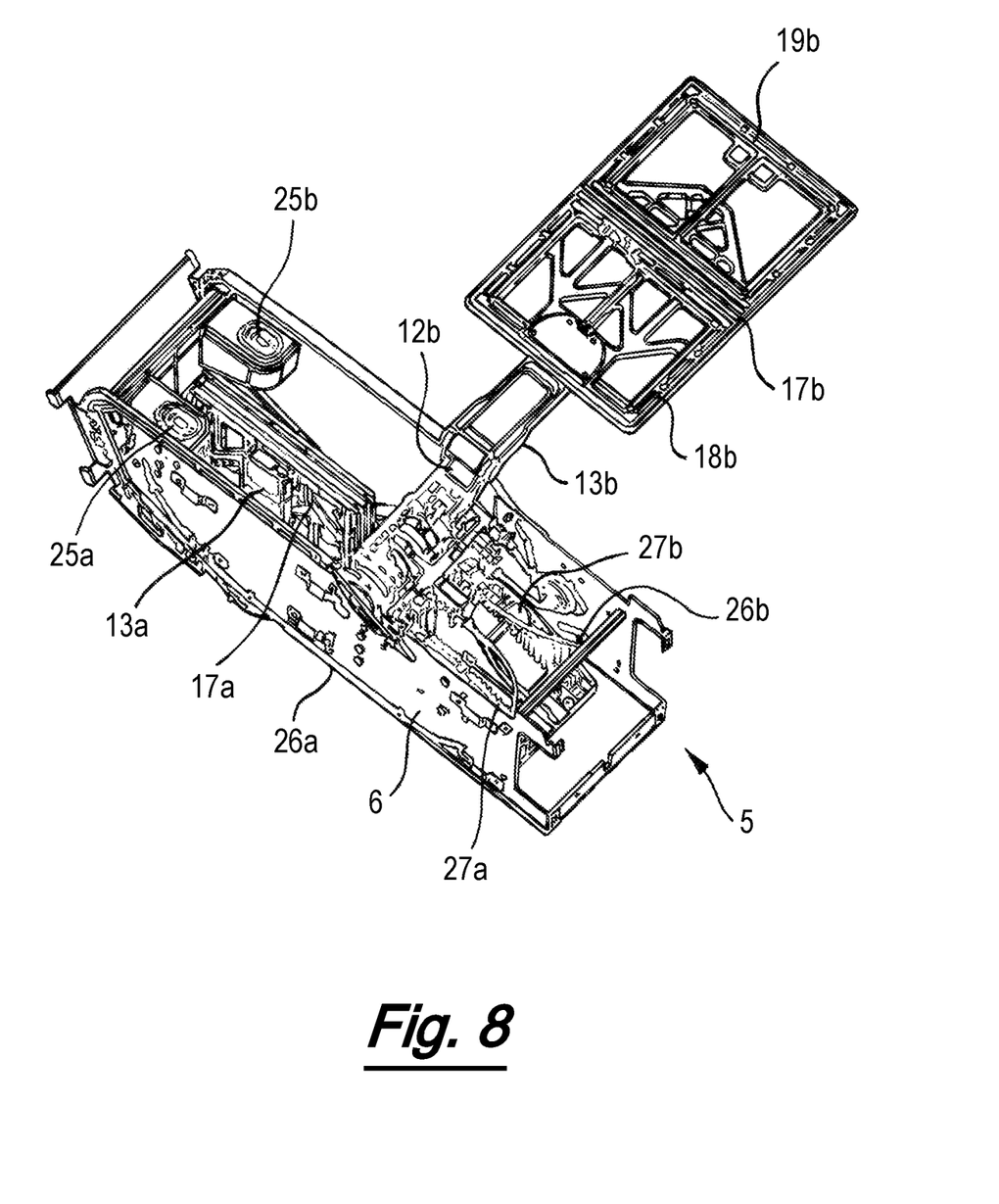
FIG. 8 shows a perspective view of the retractable table assembly of FIGS. 6 and 7 with one tabletop in the unfolded laterally deployed position.

From this position, the second leaf 19a, 19b of a tabletop 17a, 17b may be unfolded, to form a larger surface as shown in FIG. 7. Since the hinges 20 are at the distal end of the first leaf 18a, 18b, which is closer to the centre, unfolding the second leaf 19a, 19b causes the tabletop 17a, 17b to extend beyond the centrepoint of the housing 6 and towards the opposite side, so as to provide a single larger surface between two passengers.

From the initial position of FIG. 6, each tabletop 17a, 17b, can be rotated about the shaft 21 that connects it to its respective support panel 13a, 13b, to a laterally deployed position in which it extends laterally outwardly, away from the centre and in front of a passenger in a respective seat 2, 3. The tabletop 17a, 17b can be unfolded to adopt a further laterally deployed unfolded position shown in FIG. 8, in which the or each deployed tabletop 17a, 17b extends from the distal end of its respective support panel 13a, 13b in the direction away from its proximal end.

Figure 9:
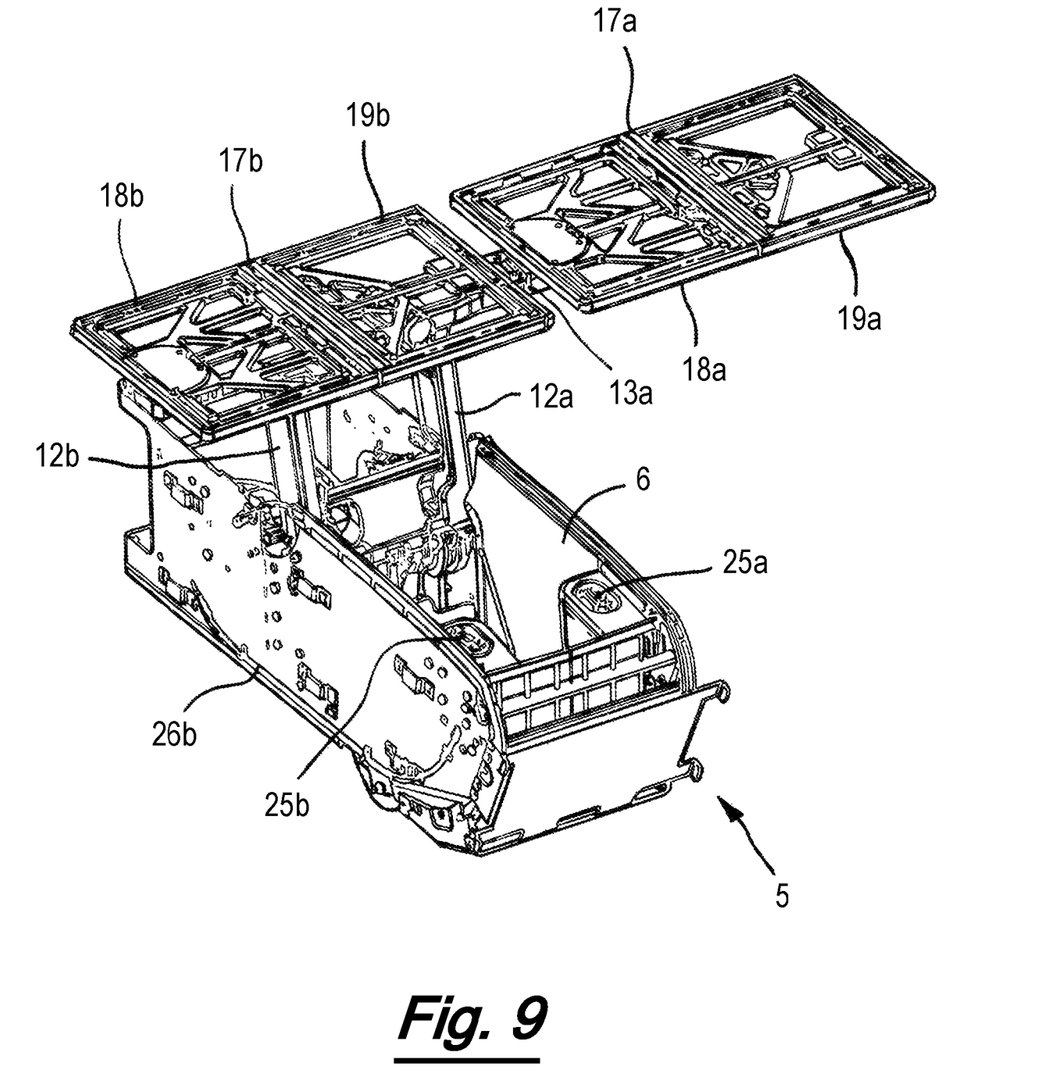
FIG. 9 shows a perspective view of the retractable table assembly of FIGS. 6-8 with the tabletops arranged in the expanded surface position.

In addition to these positions, in which the tabletops 17a, 17b act independently, the tabletops 17a, 17b may be opened together and arranged in an expanded surface position, shown in FIG. 9. In this arrangement, one of the tabletops 17a is deployed laterally and unfolded, as discussed above, extending away from the proximal end of its support panel 13a and the other tabletop 17b is deployed centrally and unfolded, whereby it extends from the distal end of its respective support panel 13b towards and beyond its proximal end and over the proximal end of the other support panel 13a, so as to be adjacent the other tabletop 17a and thereby form an expanded surface in front of a passenger and centrally. Obviously, the arrangement can be reversed, with the opposite tabletops 17a, 17b adopting the central unfolded position and lateral unfolded positions respectively.

In the expanded surface position there is a small gap, in this embodiment of 3.2 cm (i.e. about 3 cm), between the tabletops 17a, 17b. With such a small gap, the tabletops 17a, 17b effectively act as a single large surface to work on, on which work etc. can be spread out rather than split between tables.

In the expanded surface position shown in FIG. 9, the second leaf 19b of the centrally deployed tabletop 17b is supported by the support panel 13a of the laterally deployed tabletop 17a. This provides additional stability to the arrangement and makes the two tables feel more like a single surface.

Another feature of the invention can be seen in FIG. 10 which shows one tabletop 17a, and part of its support mechanism (obviously both tabletops 17a, 17b include the same features). The support panel 13a is formed in two parts—a first part 22 is connected to the mount 14a, with a second part 23 connected to the tabletop 17a. These two parts 22, 23 are connected by a shaft 24, such that the tabletop 17a may be tiltable when laterally deployed. This allows for a change of angle, which may be useful for example if the tabletop 17a, 17b is used to support a tablet for viewing movies or the like. Stops (not shown) and a button operated latch (not shown) are provided to restrict the allowed angle of tilting and to ensure that tilting only occurs when desired, i.e. when unlatched, and a damper (not shown) is also provided to damp motion and keep the respective tabletop 17a, 17b at the chosen degree of tilt.

A pair of push buttons 25a, 25b are provided at the rear of the housing, towards the side of a respective tabletop 17a, 17b, with which they are associated. Each push button 25a, 25b is connected to a respective Bowden cable 26a, which runs to the respective latch (not shown) to release the respective arm 12a, 12b from the deployed position, to allow stowage (by reversing the deployment procedure).

In order to assist deployment, the proximal end of each arm 12a, 12b is connected to resilient biasing member 27a, 27b best seen in FIGS. 4 and 5. The biasing member 27a, 27b comprises a helical compression spring 28a, 28b carried on a telescopic gas strut 33, which is pivotally attached at one end by a bracket 29a, 29b to the housing 5, forward of the axle 11, and at the opposite end to a swan-neck 30a, 30b which is attached, offset to one side of the respective arm 12a, 12b. Each compression spring 28a, 28b and gas strut 33 thus biases the respective arm 12a, 12b towards the deployed position, urging the arm 12a, 12b to pivot upwardly about the axle 11. The springs 28a, 28b and struts 33 also provide a damping effect.

Figure 11:
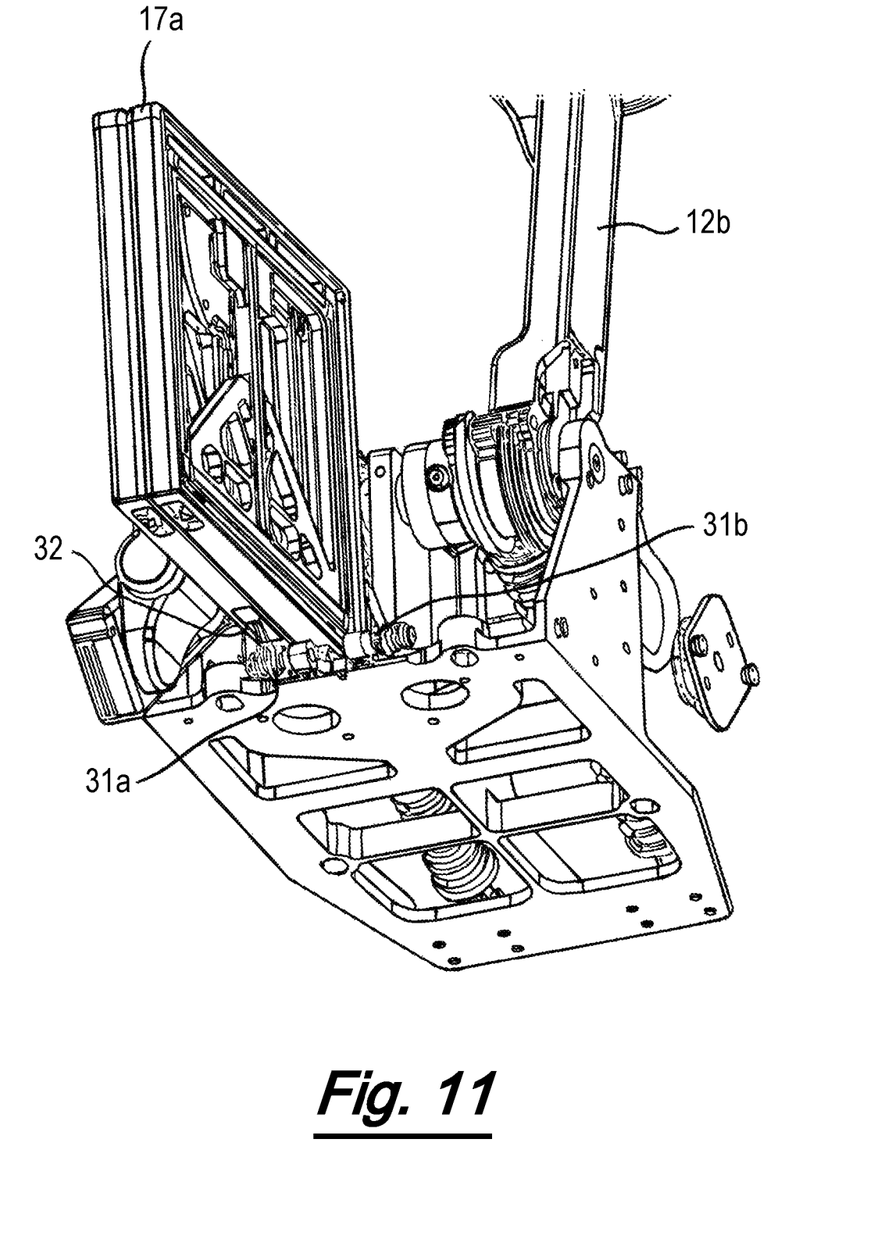
FIG. 11 shows a part-cutaway underneath perspective view of the retractable table assembly of FIGS. 1-10.
Figure 12:
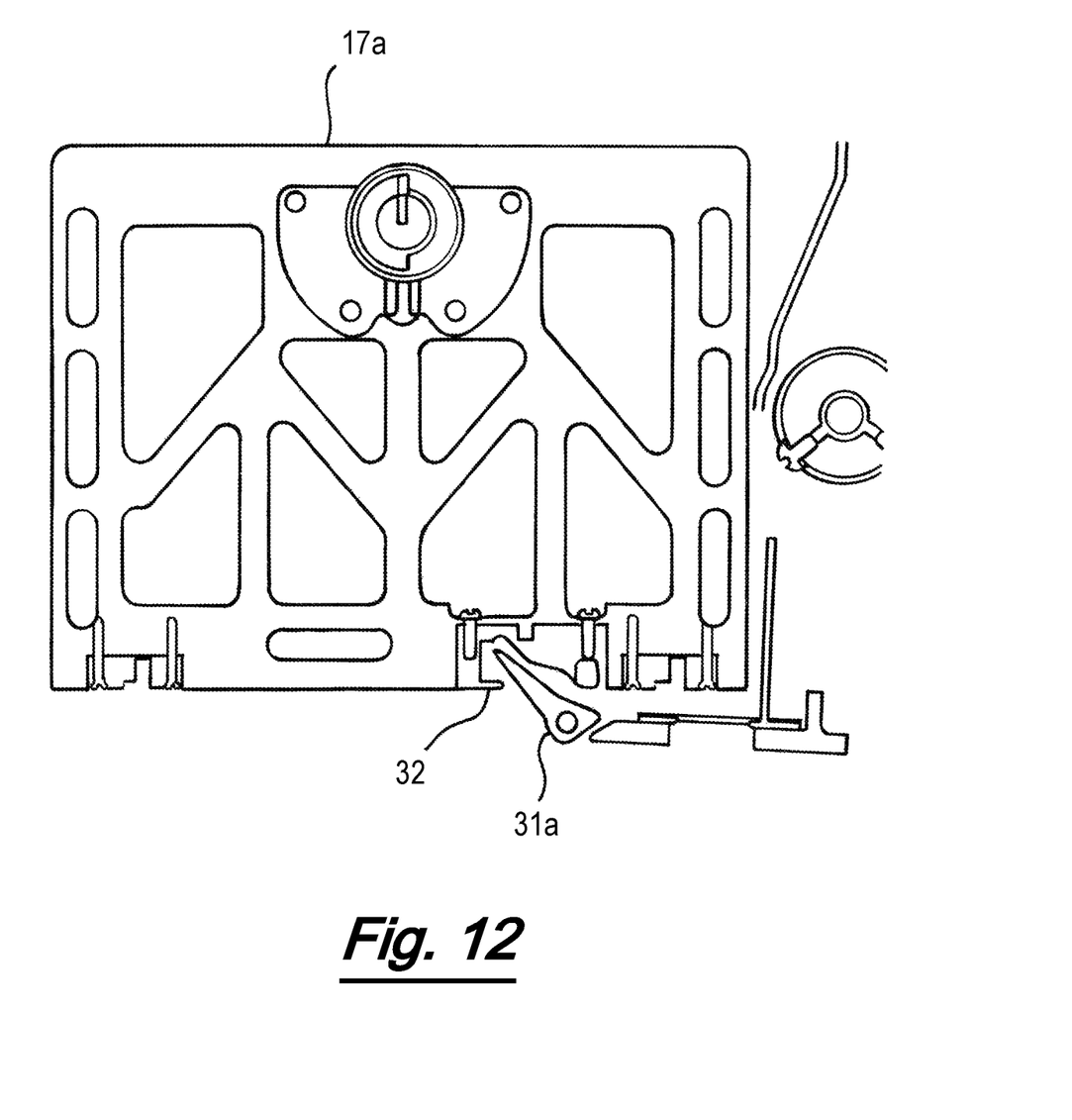
FIG. 12 is a diagrammatic view of the latching mechanism of the retractable table assembly of FIGS. 1-11.

In order to keep the tabletops 17a, 17b in the stowed position, despite the action of the resilient biasing members 27a, 27b, a pair of pin and heart-shaped push-push latches 31a, 31b (i.e. a push-to-open, push-to-close latch) are provided in the base of the housing 6, one for each tabletop 17a, 17b. As shown in FIGS. 11 and 12, each tabletop 17a, 17b, comprises a catch 32, into which the respective latch 31a, 31b engages. Each latch 31a, 31b is sprung and the catch 32 is provided with a heart-shape. This arrangement means that pushing down on the tabletop 17a, 17b forcing it into the housing 6 causes it to engage the latch 31a, 31b when released, which holds it in place against the force of the biasing member 27a, 27b. Pushing the tabletop 17a, 17b downwards again, from the engaged position, causes the latch 31a, 31b to disengage from the catch, such that the resilient biasing member 27a, 27a causes the arm 12a, 12b to rotate to move the tabletop 17a, 17b towards the deployed position.

Having a resilient bias towards the deployed position eases operation of the tabletops 17a, 17b, since the tabletops 17a, 17b are urged by the bias towards the deployed position and will therefore move automatically to an at least partially deployed position, once the respective latch 31a, 31b is released. This allows a more ergonomic pushing action to effect deployment, rather than an awkward pulling motion.

The above embodiment is described by way of example only. Many variations are possible without departing from the scope of the invention as defined in the appended claims.

The invention claimed is:

1. A retractable table assembly for arrangement centrally between two seats; the retractable table assembly comprising two tabletops each moveable between deployed positions and a retracted position and carried by a respective arm; each tabletop being mounted to its respective arm via a support panel; each support panel being pivotably mounted to the respective arm at its proximial end and connected to the respective tabletop at its distal end, wherein in the deployed positions each support panel extends laterally outwardly towards its respective seat; and wherein the tabletops are arranged such that in a centrally deployed position one tabletop is deployed centrally, between the seats, whereby the deployed tabletop extends from the distal end of the support panel towards, and beyond, its proximal end; in a laterally arranged position, either tabletop, or both tabletops are deployed laterally, whereby the or each deployed tabletop extends from the distal end of its respective support panel in the direction away from its proximal end; and in an expanded surface position, a first one of the tabletops is deployed laterally, extending away from the proximal end of its support panel and the second tabletop is deployed centrally, whereby the second tabletop extends from the distal end of its respective support panel towards and beyond its proximal end and over the proximal end of the other support panel, so as to be adjacent the first tabletop and thereby form an expanded surface.

2. The retractable table assembly according to claim 1 wherein in the expanded surface position the gap between one tabletop and the other is less than 5 cm.

3. The retractable table assembly according to claim 1 wherein the or each tabletop is rotatably connected to the respective support panel, so as to rotate relative to the respective support panel between the laterally arranged position and the centrally arranged position.

4. The retractable table assembly according to claim 1 wherein the or each tabletop is provided with two leaves, with the proximal end of the first leaf connected to the support panel and the second leaf connected to the distal end of the first leaf.

5. The retractable table assembly according to claim 4 wherein the table assembly is capable of being arranged such that in the expanded surface position, the second leaf of the centrally deployed tabletop is supported by the support panel of the laterally deployed tabletop.

6. The retractable table assembly according to claim 1 wherein the or each support panel comprises a tilting mechanism so as to adjust the angle between the proximal end connected to a respective arm, and the distal end connected to a respective tabletop.

7. A retractable table assembly, the retractable table assembly comprising a tabletop which is moveable between a deployed position and a retracted position and carried by an arm; wherein the arm is resiliently biased towards the deployed position and held in the retracted position by a push-push latch.

8. The retractable table assembly according to claim 1 wherein the arm is resiliently biased towards the deployed position and held in the retracted position by a push-push latch.

9. A retractable table assembly comprising a housing, a tabletop which is moveable between a deployed position and a retracted position, and an arm which carries the tabletop; the arm being pivotally mounted to the housing at a first pivot point and pivotally mounted to the tabletop at a second pivot point, wherein a secondary link is provided between the housing and the tabletop and offset relative to a line between the first and second pivot points in order to maintain the relative disposition of the tabletop in relation to the housing, as the arm is rotated about the first pivot point; the secondary link being provided within the arm.

10. The retractable table assembly according to claim 9 wherein the arm which carries the tabletop is pivotally mounted to the housing at a first pivot point and pivotally mounted to the tabletop at a second pivot point, wherein a secondary link is provided, preferably within the arm, between the housing and the tabletop and offset relative to the line between the first and second pivot points in order to maintain the relative disposition of the tabletop in relation to the housing, as the arm is rotated about the first pivot point; the secondary link being provided within the arm.

11. The retractable table assembly according to claim 9 wherein the tabletop is attached to the arm via a support panel.

12. The retractable table assembly according to claim 11 wherein the support panel is attached to the second pivot point and the secondary link so as to maintain its relative disposition in relation to the housing as the arm is rotated about the first pivot point.

13. The retractable table assembly according to claim 12 wherein the support panel is rotatable about a longitudinal axis.

14. The retractable table assembly according to claim 9 comprising a housing, wherein the housing extends longitudinally and the first pivot point is provided at the front of the housing, with the arm extending downwardly and rearwardly in the housing, when the tabletop is in the retracted position.

15. The retractable table assembly according to claim 1 wherein the or each tabletop is tiltable in the deployed position.

16. The retractable table assembly according to claim 1 wherein the or each arm is mounted so as to rotate about a lateral axis.

17. An automobile comprising the retractable table assembly according to claim 7.

18. An automobile comprising two rear passenger seats, with the retractable table assembly according to claim 1 located therebetween.

19. An automobile comprising the retractable table assembly according to claim 9.

* * * * *